United States Patent

Amano

[11] Patent Number: 5,222,088
[45] Date of Patent: Jun. 22, 1993

[54] SOLID-STATE BLUE LASER DEVICE CAPABLE OF PRODUCING A BLUE LASER BEAM HAVING HIGH POWER

[75] Inventor: Satoru Amano, Tokyo, Japan
[73] Assignee: Hoya Corporation, Tokyo, Japan
[21] Appl. No.: 786,387
[22] Filed: Nov. 1, 1991

[30] Foreign Application Priority Data

Nov. 5, 1990 [JP] Japan .................................... 297208

[51] Int. Cl.$^5$ .................................... H01S 3/10
[52] U.S. Cl. .................................... 372/22; 359/328
[58] Field of Search .................. 372/21, 22, 70, 71, 372/75; 359/328

[56] References Cited

U.S. PATENT DOCUMENTS 5,070,505  12/1991  Dixon .................................... 372/22

Primary Examiner—James W. Davie
Attorney, Agent, or Firm—Ladas & Parry

[57] ABSTRACT

In a solid-state blue laser device for producing a blue laser beam having a waveband of blue spectral range that is represented by a specific wavelength of, for example, 0.45 μm, the solid-state blue laser device comprises a semiconductor laser device for producing an excitation laser beam having an excitation wavelength of, for example, 0.8 μm. Excited by the excitation laser beam, a self-frequency doubling crystal, such as $Nd_xY_{1-x}Al_3(BO_3)_4$ where x has a value selected between 0.005 and 0.04, both exclusive, produces a harmonic laser beam having a wavelength of a second harmonic thereof that is equal to the specific wavelength. The solid-state blue laser device thereby produces the harmonic laser beam as the blue laser beam. The solid-state blue laser device may further comprise a condensing lens for condensing, as a condensed laser beam, the excitation laser beam onto the self-frequency doubling crystal. In order to cool the self-frequency doubling crystal, a cooler may be mounted on the self-frequency doubling crystal. An outer mirror may be disposed adjacent to the self-frequency doubling crystal to produce the harmonic laser beam as the blue laser beam. A Q-switching element may be disposed between the self-frequency doubling crystal and the outer mirror. The self-frequency doubling crystal may be directly coupled to the semiconductor laser device to produce the blue laser beam having a single longitudinal mode of $TEM_{00}$.

9 Claims, 1 Drawing Sheet

F I G. 1
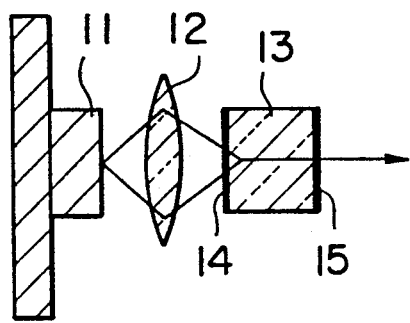
F I G. 2
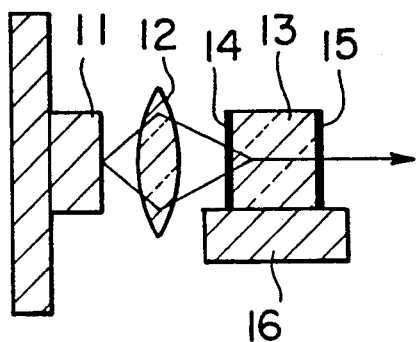
F I G. 3
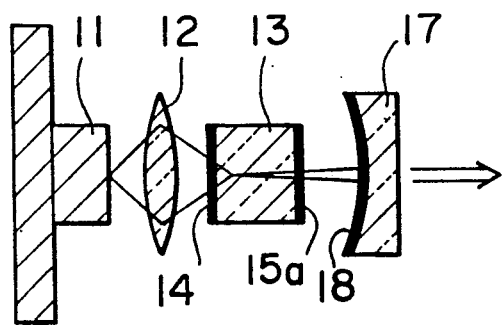
F I G. 4
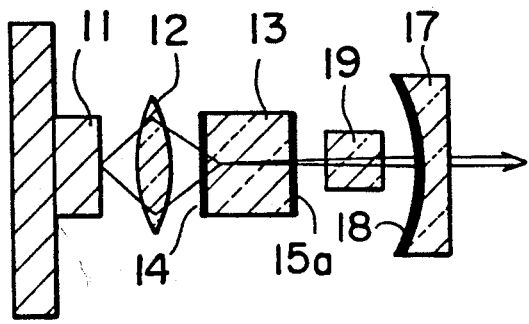
F I G. 5
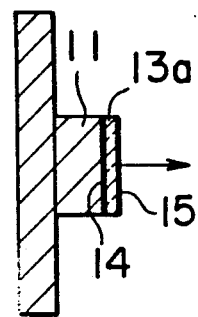

SOLID-STATE BLUE LASER DEVICE CAPABLE OF PRODUCING A BLUE LASER BEAM HAVING HIGH POWER

BACKGROUND OF THE INVENTION

This invention relates to a solid-state laser device and, more particularly, to a solid-state blue laser device comprising a semiconductor laser device as an excitation light source.

Solid-state blue laser devices are generally adapted to many applications such as a source for a high density optical disk, a measurement field for analyses, medical care and in so on, and an information processing field.

Various solid-state blue laser devices are already known. By way of example, a solid-state blue laser device is described by P. Günter in a paper submitted to "1980 European Conference on Optical Systems and Applications (Utrecht)" in SPIE Vol. 236, pages 8–18, under the title of "Nonlinear optical crystal for optical frequency doubling with laser diodes." The solid-state blue laser device of Günter comprises a semiconductor laser device formed by a semiconductor laser medium which has a composition represented by a chemical formula of $Ga_{1-x}Al_xAs$. Such a semiconductor laser device will be called a $Ga_{1-x}Al_xAs$ laser device for the purpose of simplification. When x is equal to 0.05, the $Ga_{1-x}Al_xs$ laser device emits, as an excitation laser beam, a laser beam having an emission wavelength of 860 nm at room temperature of 300 K.

The excitation laser beam is condensed or collected, as a condensed laser beam, onto a nonlinear optical crystal by a condensing optical system. The nonlinear optical crystal has a composition represented by a chemical formula of $KNbO_3$. Such a nonlinear optical crystal will be referred to as a $KNbO_3$ crystal for the purpose of simplification. The KNbO3 crystal converts the excitation laser beam having the emission wavelength of 860 nm into a converted laser beam having a converted wavelength of 430 nm. Therefore, the solid-state blue laser device of Günter produces the converted laser beam having the converted wavelength of 430 nm as a blue laser beam. The solid-state blue laser device of Günter is small in size and has light weight.

However, the solid-state blue laser device of Günter is disadvantageous in that it produces the blue laser beam with low power. This is because the blue laser beam has power dependence upon that of the excitation laser beam and therefore lower than that of the excitation laser beam. In addition, the solid-state blue laser device of Günter is defective in that it can not be operable in a Q-switching mode. This is because the solid-state blue laser device of Günter has not a gain medium such as a laser medium which accumulates light energy.

Another solid-state blue laser device is described in an article which is published by G. J. Dixon et al on OPTICS LETTERS, Vol. 13, No. 2, pages 137–139, Feb. 1988, and which is entitled "Efficient blue emission from an intracavity-doubled 946-nm Nd:YAG laser." The solid-state blue laser device of Dixon et al comprises, as a solid-state laser medium, a 2-mm-long Nd:YAG laser rod which operates at 946 nm. The Nd:YAG laser rod is polished with a 2-cm convex radius on its incoming end surface and a flat on its outgoing end surface. The Nd:YAG laser rod is pumped or excited by a 588-nm cw ring dye laser device which emits, as an excitation laser beam, a laser beam having an emission wavelength of 588 nm at room temperature.

The excitation laser beam is focused through the curved incoming end surface of the Nd:YAG laser rod with a 75-mm focal-length lens. Excited by the excitation laser beam, the Nd:YAG laser rod generates an excited laser beam having an excited wavelength of 946 nm. On the curved incoming end surface, a dichroic multilayer dielectric reflector is coated directly. The reflector has an antireflectivity greater than 99.8% at 946 nm and transmission in excess of 95% at 588 nm.

The solid-state blue laser device of Dixon et al further comprises, as a nonlinear optical crystal, a 2.5-mm $KNbO_3$ crystal. The $KNbO_3$ crystal is disposed between the Nd:YAG laser rod and a 2.5-cm-radius output coupler or mirror. Both end surfaces of the $KNbO_3$ crystal and the flat outgoing end surface of the Nd:YAG laser rod are antireflection coated for 946 nm. The output mirror is coated with a multilayer dielectric stack having greater than 99.8% reflectivity at 946 nm, greater than 80% transmission at 1.06 $\mu$m, and greater than 60% transmission at 473 nm. A combination of reflector and the output mirror is operable as a resonator in response to the excited laser beam. With this structure, the solid-state blue laser device of Dixon et al produces, as a blue laser beam, a beam having a wavelength of 473 nm. The solid-state blue laser device of Dixon et al can produce the blue laser beam having high power and is operable in a Q-switching mode. This is because the solid-state blue laser device of Dixon et al comprises the solid-laser medium which accumulates light energy.

However, the solid-state blue laser device of Dixon et al is disadvantageous in that it is bulky in size, has heavy weight, and has less reliability. This is because the solid-state blue laser device of Dixon et al comprises two optical components, namely, the solid-state laser medium and the nonlinear optical crystal. In addition, inasmuch as the nonlinear optical crystal comprises the $KNbO_3$ crystal, the nonlinear optical crystal must be accurately made thermal insulation within allowable temperature range of 0.2 °C.

A solid-state green laser device has been proposed in an article which is contributed by Lu Baosheng et al to Chinese Physics Letters Vol. 3, No. 9, pages 413–416 (1986) and which is entitled "Excited Emission and Self-Frequency-Doubling Effect of $Nd_xY_{1-x}Al_3(BO_3)_4$ Crystal." The solid-state green laser device of Lu Baosheng et al comprises, as a self-frequency doubling crystal, a crystal having a composition represented by a chemical formula of $Nd_xY_{1-x}Al_3(BO_3)_4$ and which thus includes Nd. Such a self-frequency doubling crystal will be called an $Nd_xY_{1-x}BO_3)_4$ crystal for the purpose of simplification. Inasmuch as Nd is operable as a laser activator, the $Nd_xY_{1-x}Al_3(BO_3)_4$ crystal is capable of emitting a primary laser beam which has a fundamental wavelength determined by Nd when the $Nd_xY_{1-x}Al_3(BO_3)_4$ crystal is excited or pumped by an excitation laser beam. The excitation laser beam may be referred to as a pumping laser beam. The primary laser beam will be called a fundamental laser beam. In addition, the article reports that wavelength conversion takes place within the $Nd_xY_{1-x}Al_3(BO_3)_4$ crystal so as to partially convert the primary laser beam of the fundamental wavelength into a subsidiary laser beam of a harmonic wavelength which is derived from the $Nd_xY_{1-x}Al_3(BO_3)_4$ crystal and that the $Nd_xY_{1-x}Al_3(BO_3)_4$ is capable of emitting the subsidiary laser beam of the harmonic wavelength. The subsidiary laser beam may be referred to as a harmonic laser beam. Practically, when x is smaller than 0.2, the fundamental wavelength of 1.064 μm is stably converted into a second harmonic wavelength of 0.532 μm.

In order to carry out such wavelength conversion, the self-frequency doubling crystal is combined in the solid-state green laser device of Lu Baosheng et al with a resonator and an exciter for supplying an excitation laser beam to the self-frequency doubling crystal. In the solid-state green laser device of Lu Baosheng et al, the resonator comprises an output mirror and a reflection mirror so as to provide an outer resonator for the primary laser beam of the fundamental wavelength. Both of the output mirror and the reflection mirror are opposed to both ends of the self-frequency doubling crystal with spacings left therebetween, respectively. In addition, the exciter is formed by a dye laser device directed to a side surface of the self-frequency doubling crystal with a distance left between the side surface and the dye laser.

In the solid-state green laser device of Lu Baosheng et al, each of the output mirror and the reflection mirror has an optical characteristic such that about 100% of the primary laser beam is reflected. In addition, the reflection mirror reflects about 100% of the subsidiary laser beam while the output mirror transmits 80% of the subsidiary laser beam.

Under the circumstances, when the excitation laser beam is supplied from the dye laser device to side surface of the self-frequency doubling crystal, a resonance path for the primary laser beam of the fundamental wavelength is formed between the output mirror and the reflection mirror. Subsequently, the primary laser beam is partially converted in wavelength into the subsidiary laser beam within the resonance path. As a result, the subsidiary laser beam is transmitted through the output mirror as the green laser beam.

However, the solid-state green laser device of Lu Baosheng et al is disadvantageous in that it is bulky in size and has a short life time. This is because the dye laser device is used as the exciter. Furthermore, since a dye should be exchanged from time to time, a lot of labor is necessary for maintenance of the solid-state green laser device.

In addition, the resonator is formed by the output mirror and the reflection mirror both of which are distant from the self-frequency doubling crystal. Such a resonator is large in size and therefore results in an increase of a size in the solid-state blue laser device. Moreover, the primary laser beam is objectionably weak in strength. This is because a loss inevitably takes place while the primary laser beam is propagated within a space between the output mirror and the reflection mirror. This results in a reduction of a conversion efficiency between the primary laser beam and the subsidiary laser beam.

SUMMARY OF THE INVENTION

It is therefore an object of this invention to provide a solid-state blue laser device which is capable of producing a blue laser beam having high power.

It is another object of this invention to provide a solid-state blue laser device of the type described, which is small in size and has light weight.

It is still another object of this invention to provide a solid-state blue laser device of the type described, which has high reliability.

It is yet another object of this invention to provide a solid-state blue laser device of the type described, which is operable in a Q-switching mode.

It is a further object of this invention to provide a solid-state blue laser device of the type described, which is simple in structure.

It is a still further object of this invention to provide a solid-state blue laser device of the type described, which needs no maintenance.

It is a yet further object of this invention to provide a solid-state blue laser device of the type described, which is capable of being manufactured at a low cost.

It is a still more object of this invention to provide a solid-state blue laser device of the type described, which is low in price.

Other objects of this invention will become clear as the description proceeds.

On describing the gist of an aspect of this invention, it is possible to understand that a solid-state blue laser device is for producing a blue laser beam having a waveband of blue spectral range that is represented by a specific wavelength.

According to the above-mentioned aspect of this invention, the above-understood solid-state blue laser device comprises a semiconductor laser device for producing an excitation laser beam. Excited by the excitation laser beam, a self-frequency doubling crystal produces a harmonic laser beam having a wavelength of a second harmonic thereof that is equal to the specific wavelength. The solid-state blue laser device thereby produces the harmonic laser beam as the blue laser beam.

The specific wavelength is equal, for example, to 0.45 μm. Preferably, the solid-state blue laser device may further comprise a condensing lens, which is supplied with the excitation laser beam, for condensing, as a condensed laser beam, the excitation laser beam onto the self-frequency doubling crystal. Preferably, the solid-state blue laser device may further comprise a cooler, which is mounted on the self-frequency doubling crystal, for cooling the self-frequency doubling crystal. The solid-state blue laser device may further comprise an outer mirror, which is disposed adjacent to the self-frequency doubling crystal, for producing the harmonic laser beam as the blue laser beam. The solid-state blue laser device may further comprise a Q-switching element which is disposed between the self-frequency doubling crystal and the outer mirror.

BRIEF DESCRIPTION OF THE DRAWING

FIG. 1 is a schematic cross sectional view of a solid-state blue laser device according to a first embodiment of this invention;

FIG. 2 is a schematic cross sectional view, like FIG. 1, of a solid-state blue laser device according to a second embodiment of this invention;

FIG. 3 is a schematic cross sectional view, like FIG. 1, of a solid-state blue laser device according to a third embodiment of this invention;

FIG. 4 is a schematic cross sectional view, like FIG. 1, of a solid-state blue laser device according to a fourth embodiment of this invention; and FIG. 5 is a schematic cross sectional view, like FIG. 1, of a solid-state blue laser device according to a fifth embodiment of this invention.

DESCRIPTION OF THE PREFERRED EMBODIMENTS

Referring to FIG. 1, description will proceed with respect to a solid-state blue laser device according to a first embodiment of this invention. The solid-state blue laser device produces a blue laser beam having a waveband of blue spectral range. In the example being illustrated, the waveband of blue spectral range is represented by a specific wavelength of 0.45 μm.

The solid-state blue laser device comprises a semiconductor laser device 11 for producing an excitation laser beam having an excitation waveband which is represented by an excitation wavelength. The semiconductor laser device 11 is used as an excitation light source or an exciter. The semiconductor laser device 11 may be of broad area type SLD303WT, produced by SONY Corporation, which has a maximum power of 500 mW and which has the excitation wavelegnth of 0.8 μm.

The excitation laser beam is condensed or collected into a condensed laser beam by a condensing lens 12. The condensed laser beam is supplied to a self-frequency doubling crystal 13. That is, the condensing lens 12 is for condensing the excitation laser beam as the condensed laser beam onto the self-frequency doubling crystal 13 to effectively excite or pump the self-frequency doubling crystal 13 by the excitation laser beam. In the example being illustrated, the condensing lens 12 consists of only one convex lens. The condensing lens 12 may comprise a lens system which consists of a plurality of lenses, instead of the convex lens.

In the example being illustrated, the self-frequency doubling crystal 13 has a composition represented by a chemical formula of $Nd_xY_{l-x}Al_3(BO_3)_4$ and therefore includes Nd acting as a laser activator. Such a crystal is called an $Nd_xY_{l-x}Al_3(BO_3)_4$ crystal. Herein, the $Nd_xY_{l-x}Al_3(BO_3)_4$ crystal will be called an NYAB crystal for the purpose of simplification. In the example being illustrated, the NYAB crystal includes Nd ions whose x is equal to 0.02. The self-frequency doubling crystal 13 may have, for example, a rectangular prallelpiped shape which has, in size, a cross section having one side of 3 mm and which has a length of 5 mm. The NYAB crystal is a negative uniaxial crystal which belongs to the point group R32 and is grouped into a trigonal system from the point of crystalline structure.

In the self-frequency doubling crystal 13, an angular phase matching condition is given as follows. The self-frequency doubling crystal 13 is characterized by an effective nonlinear optical coefficient $d_{eff}$ in Type I angular phase matching which is given by:

$$d_{eff} = d_{ll} \times \cos\theta_m \times \cos3\phi$$

where $\theta$ and $\phi$ represent angles in polar coordinates inclined to a Z-axis and an X-axis and an X-axis in the crystal, respectively. In addition, a phase matching angle $\theta_m$ is given by:

$$\sin^2\theta_m = \{[n_o(w)]^{-2} - [n_o(2w)]^{-2}\} / \{[n_e(2w)]^{-2} - [n_o(2w)]^{-2}\},$$

where $n_o(w)$ represents a refractive index for a primary ordinary ray having a fundamental wavelength of 0.9 μm, $n_o(2w)$, another refractive index for a subsidiary ordinary ray having a second harmonic wavelength of 0.45 μm, and $n_e(2w)$, still another refractive index for a subsidiary extraordinary ray having the second harmonic wavelgnth of 0.45 μm. Incidentally, $n_e(w)$ represents yet another refractive index for a primary extraordinary ray having the fundamental wavelength of 0.9 μm.

As well known in the art, a refractive index n is generally represented by a Sellmeier's Equation as follows:

$$n^2 = A + [B/\{1 - C/\lambda^2\}] + [D/\{1 - E/\lambda^2\}]$$

where λ represents a wavelength represented by a unit of μm, and A, B, C, D, and E and represent coefficients. The coefficients A, B, C, D, and E for the ordinary ray are given by calculation as follows:
A = 3.134262,
B = 3.2447726 × 10⁻²,
C = 0.1264657,
D = 4.461347 × 10⁴, and
E = 5.59046 × 10⁵.

In addition, the coefficients A, B, C, D, and E for the extraordinary ray are given by calculation as follows:
A = 2.860450,
B = 3.608948 × 10⁻²,
C = 0.1208717,
D = 4.689097 × 10³, and
E = 9.609480 × 10⁴.

To substitute those values of the coefficients into the above-mentioned Sellmeier's Equation, the refractive indexes $n_o(w)$, $n_e(w)$, $n_o(2w)$, and $n_e(2w)$ are given by as follows:
$n_o(w) = 1.7636$,
$n_e(w) = 1.6925$,
$n_o(2w) = 1.7915$, and
$n_e(2w) = 1.7160$.

By using those values of the refractive indexes $n_o(w)$, $n_o(2w)$, and $n_e(2w)$, the phase matching angle $\theta_m$, which satisfies the angular phase matching condition, has a value as follows:

$$\theta_m = 36.54°.$$

On the other hand, the angle $\phi$ satisfies the angular phase matching condition at three values, namely, 0°, 60°, and 120°. In the example being illustrated, 0° is used as the angle $\phi$.

Therefore, the NYAB crystal has a crystal axis which is cut down, in relation to a plane of polarization of the excitation laser beam, at the angles $\theta_m$ and $\phi$ equal to 36.54° and 0°, respectively. As a result, the self-frequency doubling crystal 13 is operable as a solid-state laser medium and practically can generate a primary laser beam having the fundamental wavelength of 0.9 μm.

The self-frequency doubling crystal 13 has an incoming flat end surface and an outgoing flat end surface each of which is polished with the incoming and the outgoing end surfaces opposed in parallel each other.

The incoming flat end surface of the self-frequency doubling crystal 13 is supplied with the condensed laser beam from the condensing lens 12. The incoming flat end surface is coated with an incoming film 14, as illustrated by a thick line in FIG. 1. The incoming film 14 sufficiently transmits the condensed laser beam having the excitation wavelength and sufficiently reflects the primary laser beam having the fundamental wavelength. In the example being illustrated, the first incoming film 14 has a transmittance greater than 95% for the excitation wavelength of 0.8 μm and has reflectances greater than 98% for the primary wavelength of 0.9 μm.

The outgoing flat end surface of the self-frequency doubling crystal 13 is coated with an outgoing film 15, as illustrated by another thick line in FIG. 1. The outgoing film 15 sufficiently reflects the primary laser beam having the fundamental wavelength of 0.9 μm, sufficiently transmits the laser beam having a wavelength of 1.06 μm, and sufficiently transmits the subsidiary laser beam having the second harmonic wavelength of 0.45 μm. In the example being illustrated, the outgoing film 15 has a reflectance greater than 99% for the fundamental wavelength of 0.9 μm, has a transmittance greater than 99% for the wavelength of 1.06 μm, and has a transmittance greater than 98% for the second harmonic wavelength of 0.45 μm.

Therefore, a combination of the incoming film 14 and the outgoing film 15 serves as a resonator for the primary laser beam having the fundamental wavelength.

Each of the incoming film 14 and the outgoing film 15 is structured by a multilayer film composed of a plurality of $TiO_2$ $SiO_2$ films by using vapor deposition as well known in the art. In this event, it is needless to say that the incoming film 14 comprises the $TiO_2$ and the $SiO_2$ films different in number from those of the outgoing film 15. In any event, it is to be noted that the incoming film 15 and the outgoing film 16 are brought into contact with the incoming and the outgoing flat end surfaces of the self-frequency doubling crystal 13 without any gap between the incoming film 15 and the incoming flat end surface and between the outgoing film 16 and the outgoing flat end surface.

Now, the operation will be described with reference to FIG. 1 for a better understanding of this invention.

At first, the excitation laser beam is focused onto an optical axis adjacent to the incoming flat end surface of the self-frequency doubling crystal 13. The excitation laser beam is entered into the self-frequency doubling crystal 13 through the incoming film 14 to form an internal path of the excitation laser beam. On the other hand, resonant optical paths for the primary laser beam of the fundamental wavelength are formed within the self-frequency doubling crystal 13. The internal path of the excitation laser beam is selected so that it is included in the resonant optical paths.

When the self-frequency doubling crystal 13 is excited by the excitation laser beam as a high excitation efficiency, the primary laser beam is generated due to presence of the laser activator, namely, Nd and forms the resonant optical paths between the incoming and the outgoing films 14 and 15 because both the films 14 and 15 sufficiently reflect the primary laser beam, as mentioned before. From this fact, it is readily understood that the incoming and the outgoing films 14 and 15 are operable as the resonator attached to the self-frequency doubling crystal 13 without any gap. As a result, the primary laser beam is substantially confined within the self-frequency doubling crystal 13.

With this structure, the primary laser beam is partially converted in wavelength into the subsidiary laser beam of the second harmonic wavelength of 0.45 μm at the resonant optical paths within the self-frequency doubling crystal 13. The subsidiary laser beam travels along a traveling direction of the primary laser beam and reaches the outgoing film 15 which transmits the subsidiary laser beam, as mentioned before. On the other hand, the subsidiary laser beam is sufficiently reflected by the incoming film 14. Under the circumstances, the subsidiary laser beam is transmitted through the outgoing film 15 as the blue laser beam.

As mentioned before, the incoming and the outgoing films 14 and 15 are coated as optical elements on the incoming and the outgoing flat end surfaces of the self-frequency doubling crystal 13 so as to form the resonator for the primary laser beam. In other words, no gap is left between the resonator and the self-frequency doubling crystal 13. This shows that no loss takes place within the resonator. Accordingly, it is possible with this solid-state blue laser device to suppress that reduction of a quantity of light which might result from the loss occurring within the resonator.

Inasmuch as the solid-state blue laser device comprises the self-frequency doubling crystal 13 which is operable as a gain medium, the solid-state blue laser device can produce the blue laser beam having the specific wavelength of 0.45 μm with high power without using both of a laser medium and a nonlinear optical crystal. As a result, the solid-state blue laser device is small in size and has light weight and high reliability.

Preferably, the self-frequency doubling crystal 13 may have a crystal length which is selected from a range between 0.3 mm and 5 mm. Under the circumstances, the NYAB crystal may include Nd where x has a value selected between 0.005 and 0.04, both exclusive. This is because a wavelength conversion efficiency from the primary laser beam to the subsidiary laser beam radically reduces when x is not larger than 0.005. In addition, when x is not smaller than 0.4, absorption coefficient for the subsidiary laser beam increases and therefore the effective nonlinear optical coefficient $d_{eff}$ decreases. This results in a reduction of the wavelength conversion efficiency.

Referring to FIG. 2, a solid-state blue laser device according to a second embodiment of this invention is basically similar to that illustrated in FIG. 1 except that the solid-state laser device further comprises a cooler 16 which is mounted on and thermally coupled to the self-frequency doubling crystal 13.

As known in the art, the self-frequency doubling crystal 13 generates the primary laser beam having the fundamental wavelength of 0.9 μm on a laser transition of a three level. In order to produce the blue laser beam with more high power, the self-frequency doubling crystal 13 is cooled by the cooler 16. In the example being illustrated, the cooler 16 is a Peltier effect element so as to keep the self-frequency doubling crystal 13 at a predetermined temperature of, for example, 10° C.

Inasmuch as the illustrated solid-state blue laser device is kept at the predetermined temperature by the use of the Peltier effect element 16. Therefore, a distance or length between the incoming and the outgoing films 14 and 15 is substantially kept invariable, which enables stable oscillation of the primary laser beam. Additionally, a temperature of the self-frequency doubling crystal 13 is always kept substantially constant to satisfy the angular phase matching condition of the wavelength conversion from the primary laser beam to the subsidiary laser beam. Accordingly, it is possible to stably carry out the wavelength conversion between the primary and the subsidiary laser beam in the self-frequency doubling crystal 13.

Referring to FIG. 3, a solid-state blue laser device according to a third embodiment of this invention is basically similar to that illustrated in FIG. 1 except that the solid-state laser device further comprises an outer mirror 17 which is disposed adjacent to the self-frequency doubling crystal 13 with a space left therebetween.

The outer mirror 17 has an incoming concave end surface which is coated with another incoming film 18. The incoming film 18 has a reflectance greater than 98% for the primary laser beam having the fundamental wavelength of 0.9 μm, has a transmittance greater than 98% for the laser beam having the wavelength of 1.06 μm, and has a transmittance greater than 98% for the subsidiary laser beam having the second harmonic wavelength of 0.45 μm.

Instead of the outgoing film 15, a different outgoing film 15a is coated on the outgoing flat end surface of the self-frequency doubling crystal 13. The outgoing film 15a has transmittances greater than 99% for both of the primary and the subsidiary laser beams which have the fundamental and the second harmonic wavelengths of 0.9 μm and of 0.45 μm, respectively.

With this structure, a combination of the incoming film 14 and the incoming film 18 acts as a resonator for the primary laser beam having the fundamental wavelength. As a result, this solid-state blue laser produces the blue laser beam having the specific wavelength of 0.45 μm in the similar manner as described in conjunction with FIG. 1.

Referring to FIG. 4, a solid-state blue laser device according to a fourth embodiment of this invention is basically similar to that illustrated in FIG. 3 except that the solid-state blue laser device further comprises a Q-switching element 19 which is disposed or inserted between the self-frequency doubling crystal 13 and the outer mirror 18.

While the solid-state blue laser device according to each of the above-mentioned first through the third embodiments carries out a laser oscillation for the wavelength of 0.45 μm in accordance with a continuous oscillation mode, the solid-state blue laser device according to the fourth embodiment carries out another laser oscillation in accordance with a Q-switching mode.

In the example being illustrated, the Q-switching element 19 is an acousto-optical modulator. A principle of operation for the acousto-optical modulator is well known in the art and therefore description thereto is omitted for the purpose of simplification of the description.

The acousto-optical modulator comprises an acousto-optical medium which may be flint glass of, for example, FD-6 which is manufactured and sold by Hoya Corporation and which sufficiently transmits the primary and the subsidiary laser beams having the fundamental and the second harmonic wavelengths of 0.9 μm and 0.45 μm. The acousto-optical medium, namely, the flint glass has incoming and outgoing end surfaces each of which is coated with a film (not shown) having a transmittance greater than 99% for the primary and the subsidiary laser beams having the fundamental and the second harmonic wavelengths of 0.9 μm and 0.45 μm. Into the acousto-optical medium transmits a ultrasonic wave which has a central ultrasonic frequency of, for example, 80 MHz and which is produced by a transducer (not shown) driven by a driving circuit (not shown). By turning on/off the driving circuit, the solid-state blue laser device carries out the laser oscillation for the blue laser beam having the specific wavelength of 0.45 μm in accordance with the Q-switching mode.

The Q-switching element 19 may be an electro-optic crystal, an F-center laser crystal, or the like. The electro-optic crystal may preferably be an $LiNbO_3$ crystal or a KDP crystal. The F-center laser crystal comprises an alkali halide crystal in which electrons are trapped by gamma rays, X-rays, an electron beam, and so on. The alkali halide crystal may preferably be an LiF crystal.

Referring to FIG. 5, a solid-state blue laser device according to a fifth embodiment of this invention is basically similar to that illustrated in FIG. 1 except that the condensing lens 12 is omitted and therefore the self-frequency doubling crystal is directly mounted on or coupled to the semiconductor laser device 11.

Instead of the self-frequency doubling crystal 13 as illustrated in FIG. 1, the solid-state blue laser device comprises a different self-frequency doubling crystal 13a having a crystal length of, for example, 0.5 mm. With this structure, the solid-state blue laser device produces the blue laser beam having a single longitudinal/transverse mode of $TEM_{00}$. For this purpose, the semiconductor laser device 11 preferably may be a device for emitting the excitation laser beam having the transverse mode of $TEM_{00}$.

Preferably, the crystal length of the self-frequency doubling crystal 13a may be a length which is selected between 0.3 mm and 0.7 mm, both exclusive. This is because a wavelength conversion efficiency from the primary laser beam to the subsidiary laser beam radically reduces when the crystal length of the self-frequency doubling crystal 13a is not longer than 0.3 mm. In addition, it is impossible to produce the blue laser beam having the single longitudinal mode when the crystal length of the self-frequency doubling crystal 13a is not shorter than 0.7 mm.

While this invention has thus far been described in conjunction with several preferred embodiments thereof, it will now readily be possible for those skilled in the art to develop various other embodiments of this invention. For example, the self-frequency doubling crystal may be excited from a side surface thereof, in lieu of excitation of the self-frequency doubling crystal from its end surface.

What is claimed is:

1. A solid-state blue laser device for producing a blue laser beam having a waveband of blue spectral range that is represented by a specific wavelength, said solid-state blue laser device comprising:
   a semiconductor laser device for producing an excitation laser beam; and
   a self-frequency doubling crystal, which is excited by said excitation laser beam, for producing a harmonic laser beam having a wavelength of a second harmonic thereof that is equal to said specific wavelength, said self-frequency doubling crystal being composed of $Nd_xY_{1-x}Al_3(BO_3)_4$ where x has a value between 0.005 and 0.04, both exclusive, said self-frequency doubling crystal having a crystal axis which is cut down, in relation to a plane of polarization of said excitation laser beam, at phase matching angles $\theta m$ and $\phi$ equal to 36.54° and 0°, respectively, where $\theta m$ and $\phi$ represent angles in polar coordinates inclined to a Z-axis and an X-axis in said self-frequency doubling crystal, respectively, whereby said solid-state blue laser device produces said harmonic laser beam as said blue laser beam.

2. A slid-state blue laser device as claimed in claim 1, wherein said specific wavelength is equal to 0.45 μm.

3. A solid-state blue laser device as claimed in claim 1, further comprising a condensing lens combined with said excitation laser beam for condensing, as a condensed laser beam, said excitation laser beam onto said self-frequency doubling crystal.

4. A solid-state blue laser device as claimed in claim 1, further comprising a cooler, which is mounted on said self-frequency doubling crystal, for cooling said self-frequency doubling crystal.

5. A solid-state blue laser device as claimed in claim 1, further comprising an outer mirror, which is disposed adjacent to said self-frequency doubling crystal, for producing said harmonic laser beam as said blue laser beam.

6. A solid-state blue laser device as claimed in claim 5, further comprising a Q-switching element which is disposed between said self-frequency doubling crystal and said outer mirror.

7. A solid-state blue laser device as claimed in claim 1, wherein said self-frequency doubling crystal has a crystal length between 0.3 mm and 5 mm.

8. A solid-state blue laser device as claimed in claim 1, wherein said self-frequency doubling crystal is directly coupled to said semiconductor laser device, whereby said solid-state blue laser device produces said blue laser beam which has a single longitudinal mode of $TEM_{00}$.

9. A solid-state blue laser device as claimed in claim 8, wherein said self-frequency doubling crystal has a crystal length which is between 0.3 mm and 0.7 mm.

* * * * *